(12) United States Patent
Jost

(10) Patent No.: US 7,414,521 B2
(45) Date of Patent: Aug. 19, 2008

(54) METHOD AND DEVICE FOR ASSIGNING A WHEEL UNIT TO ITS WHEEL POSITION

(75) Inventor: Andreas Jost, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 11/348,763

(22) Filed: Feb. 7, 2006

(65) Prior Publication Data

US 2006/0187013 A1   Aug. 24, 2006

(30) Foreign Application Priority Data

Feb. 7, 2005   (DE) .................. 10 2005 005 560

(51) Int. Cl.
*B60C 23/02* (2006.01)
*B60Q 1/00* (2006.01)
*G08B 21/00* (2006.01)

(52) U.S. Cl. .................. 340/442; 340/438; 340/445; 340/447; 340/426.33; 73/146; 73/146.5; 702/150

(58) Field of Classification Search .................. 340/442
See application file for complete search history.

(56) References Cited

U.S. PATENT DOCUMENTS

| | | | |
|---|---|---|---|
| 5,774,047 A | 6/1998 | Hensel, IV | |
| 6,018,993 A | 2/2000 | Normann et al. | |
| 6,181,241 B1 | 1/2001 | Normann et al. | |
| 6,888,446 B2 | 5/2005 | Nantz et al. | |
| 6,980,099 B2 | 12/2005 | Kroitzsch et al. | |
| 2004/0008108 A1 | 1/2004 | Kroitzsch et al. | |
| 2004/0021562 A1 | 2/2004 | Prenninger | |
| 2004/0164854 A1 | 8/2004 | Nantz et al. | |
| 2005/0178193 A1* | 8/2005 | Kuchler ....................... 73/146 |

FOREIGN PATENT DOCUMENTS

| | | |
|---|---|---|
| DE | 102 23 214 A1 | 12/2003 |
| DE | 102 29 465 A1 | 1/2004 |
| DE | 103 24 083 A1 | 9/2004 |
| EP | 0 760 299 A1 | 3/1997 |
| EP | 0 861 160 B1 | 4/2000 |

* cited by examiner

*Primary Examiner*—Donnie L Crosland
(74) *Attorney, Agent, or Firm*—Laurence A. Greenberg; Werner H. Stemer; Ralph E. Locher

(57) ABSTRACT

In the automotive industry that there is an increasing need for automatic tire pressure checking systems. One challenge here is to identify the positions of the tires on the vehicle. This is normally programmed-in it at the factory at the end of the production line. The tires however mostly do not remain in the same position during their lifetime. The invention allows a wheel unit to be automatically assigned to its wheel position on the motor vehicle. To this end the attenuation along a transmit path from a wheel unit to a transmission unit or receiving unit on the motor vehicle is determined. The attenuation determined is a characteristic value which allows conclusions to be drawn about the position of a wheel unit. An assignment by way of the attenuation has the advantage that the wheel unit is independent of variations in the transmit power of the transmission unit.

31 Claims, 2 Drawing Sheets

METHOD AND DEVICE FOR ASSIGNING A WHEEL UNIT TO ITS WHEEL POSITION

BACKGROUND OF THE INVENTION

Field of the Invention

The invention lies in the automotive technology field. More specifically, the invention relates to a method and a device for assigning a wheel unit to its wheel position on a motor vehicle. The wheel unit features a transmitter unit and an evaluation unit is disposed on the motor vehicle. A receive unit is assigned to the evaluation unit for receiving a signal emitted by the wheel unit. The signal can be distinguished from signals of other wheel units, with the intensity of the signal being measured in the receive unit and a characteristic value representing an assignment of the transmission path from wheel position to receive unit being stored in the evaluation unit.

In the automotive industry there is an increasing need for automatic tire pressure checking systems. Of primary importance here is the tire pressure, but other parameters such as temperature can also be of interest. To this end sensors are incorporated in the tire, on the tire or in the valve, to measure the tire pressure. The measured values are then transmitted to a central evaluation unit.

One challenge here is to identify the position of the tire on the vehicle. This is normally programmed-in at the factory at the end of the production line. Each tire possesses its own address for this purpose. The tires however mostly do not remain in the same position during their lifetime. Sometimes the front tires are swapped with the rear tires to balance out the different levels of wear. Also when the change is made from summer to winter tires the tires are normally not fitted at the same position as they were in the previous year.

Various approaches to the solution are known from the prior art which make an automated identification of the tire positions possible. To wit:

A method is known from European patent EP 0 861 160 B1 and U.S. Pat. No. 6,181,241 B1 for assigning transmitters to receive antennas in which each wheel is assigned a pressure measurement sensor, a transmitter and a transmit antenna. In addition each wheel is assigned a receive antenna on the bodywork which is linked via a cable in each case to a receiver and evaluation unit. The codes are assigned to the wheel positions by a transmitter or the associated transmit antenna sending a signal being received by all receive antennas and by the wheel positions of that receive antenna which delivers the signal with the greatest intensity being assigned to the corresponding transmitter and its identifier.

The installation and maintenance of such a system is relatively expensive however since there have to be receivers accommodated in the vicinity of all the tire positions and these have to be cabled up.

A tire pressure monitoring system is known from U.S. Pat. No. 5,774,047 which contains at least two receive antennas and can determine the wheel positions by means of the phase difference and the polarity of identified signals at the different positions of the antennas on the bodywork.

Such an evaluation of the polarity and phase relationships of the signals is however associated with a significant outlay in circuitry.

A device is known from European published patent application EP 0 760 299 A1 which determines the direction of rotation of the wheels (clockwise/counter clockwise) and can determine in this way whether the wheel is located on the left hand or right hand side of the vehicle.

The disadvantage of this invention is that the axle on which the wheel is mounted remains unknown.

A configuration is known from DE 102 29 465 A1 and U.S. Pat. No. 6,980,099 B2 in which at least one receive antenna is positioned in the motor vehicle and exhibits such a directional characteristic that receive signals of different power in each case are produced at the location of the receive antenna for at least two send antennas. These signals are compared to threshold values stored in an evaluation unit or ranges of values and can thus be assigned to a wheel position.

With such a configuration the absolute values of the signal power are measured at the location of the receive antenna. The transmit powers of the transmitters can vary however, as a result of a temperature variations for example. This can lead to an incorrect assignment of a signal to wheel position.

SUMMARY OF THE INVENTION

It is accordingly an object of the invention to provide a method and a device for assigning a wheel unit to a wheel position thereof which overcomes the disadvantages of the here-tofore-known devices and methods of this general type.

With the foregoing and other objects in view there is provided, in accordance with the invention, a method for assigning a wheel unit to a wheel position on a motor vehicle, which comprises:

providing the wheel unit with a transmission unit for emitting a signal;

providing an evaluation unit on the motor vehicle, and a receiving unit connected to the evaluation unit and disposed to receive the signal emitted by the wheel unit, the evaluation unit having stored therein a characteristic value representing an assignment of a transmission path from a given wheel position to the receiving unit;

measuring an intensity of the signal emitted by the wheel unit in the receiving unit and communicating the intensity to the evaluation unit;

determining a characteristic value from a logical combination of the intensity of the signal measured in the receiving unit and the intensity at the location of the wheel unit; and applying the assignment to the characteristic value determined in the determining step.

Instead of the power or the intensity of signals emitted by the wheel units at a fixed location in the vehicle, a characteristic value is determined which depends on the transmit path but not however on the signal power. One such characteristic value is the attenuation for example. In this document the term attenuation includes the attenuation and any characteristic value representing the attenuation such as for example the percentage of the energy of an emitted signal which arrives at the end of a radio link. In the same sense the term intensity includes the intensity and each characteristic value representing the intensity such as for example the field strength, the power, the power density or the energy density.

In an alternative implementation, there is provided a method for assigning a wheel unit to a wheel position on a motor vehicle, which comprises:

providing a first transmissing unit and an evaluation unit on the motor vehicle, assigning the evaluation unit a first receiving unit, and providing the wheel unit with a second transmitter unit;

providing the wheel unit with a second receiving unit for receiving a signal emitted by the first transmission unit, and wherein the evaluation unit has a characteristic value stored therein representing an assignment of the transmission path from the first transmission unit to a wheel position;

transmitting a given signal with the first transmission unit;

measuring an intensity of the given signal at a location of the first transmission unit;

sending, with the first transmission unit, a message containing the intensity of the given signal at the location of the first transmission unit;

measuring an intensity of the given signal at a location of the second receiving unit;

determining a characteristic value from a logical combination of the intensity measured at the location of the first transmitter unit and the intensity measured at the location of the second receiving unit;

sending a message from the second transmission unit to the evaluation unit that can be distinguished from messages sent by other wheel units, the message containing the intensity of the signal measured at the location of the second receiving unit or of the characteristic value; and applying the assignment to the characteristic value determined in the determining step.

That is, the attenuation along a path can be determined by taking two intensity measurements that the two ends of the path. To measure the intensity at two places, as specified in the first above-outlined variant, a signal can be emitted by a wheel unit and detected by a receiver unit which is arranged at a position on the vehicle known to the evaluation unit. The signal can however, as specified in this second embodiment of the method, also be emitted by a transmitter unit assigned to an evaluation unit and detected by a receiver unit on the wheel. The paths between two wheel positions and the attenuation along these paths respectively provide information about the relative positions of the wheel units to each other. On the one hand they present additional information with which the security of an assignment of wheel unit to its wheel position can be increased. On the other hand the absolute position of wheel units can also be determined with this information if the position of at least one wheel and unit is known.

The Following Method Steps i) the intensity of the emitted signal is measured by a wheel unit and communicated to an evaluation unit;

ii) a characteristic value is determined from a logical combination of the intensity of the signal measured in the receiver unit and the intensity at the location of the wheel unit;

iii) the assignment is applied to the characteristic value determined in step ii), assign its wheel position to a wheel unit. The advantage of this method is that the assignment is undertaken using a characteristic value which does not depend on variations in the transmit power.

By Performing the Following Method Steps i) the intensity of the emitted signal at the location of the first transmitter is measured;

ii) the first transmitter unit sends a message containing the intensity measured in step i);

iii) the intensity of the signal transmitted in step i) is measured at the location of the second receiver unit;

iv) a characteristic value is determined from logical combination of the intensity measured at the location of the first transmit unit and the intensity measured at the location of the second receiver unit;

v) the second transmitter unit sends a message to the evaluation unit which can be distinguished from messages which are sent by other wheel units, with the message including the intensity of the signal measured at the location of the receiver unit or the characteristic value determined;

vi) the assignment is applied to the characteristic value determined in step iv), a wheel unit is assigned to its wheel position. The primary advantage of this method is that the assignment is undertaken using a characteristic value which does not depend on variations in the transmit power.

The fact that the wheel unit of the assembly features a receiver unit for receiving a signal transmitted by the first transmit unit and a characteristic value representing an assignment of the transmit path first transmitter unit is stored in the evaluation unit, enables the wheel unit to be assigned to its wheel position, with the assignment being undertaken on the basis of a characteristic value which does not depend on variations in the transmit power. This configuration has the additional advantages that a) the wheel unit can be instructed when it is to transmit, b) the wheel unit can detect signal collisions, c) the wheel unit can be notified of signal collisions, d) the wheel unit can be instructed to send a signal again if it has not reached its intended destination.

The fact that the wheel unit features a receiver unit means that it can also receive signals from other wheel units, The content of these signals as well as signal parameters at the location of the receiving wheel unit represent further information from which the position of the wheel units relative to each other can be determined or the reliability of an assignment of wheel units to wheel positions can be additionally increased by means of a redundant assignment. The signal power in particular is used as signal parameter since this is easy to measure. Since the send power at the location of the transmitting wheel unit as well as at the location of the receiving wheel unit can be measured, the attenuation on the path between these two wheel units can also be determined. As well as the measurement of the signal power however, a measurement of other parameters is also conceivable, such as for example the phase, the polarity or the time of arrival (for calculating the delay time of the signal from its creation to its detection).

The fact that the wheel unit features a receiver unit means that it cannot only receive and forward data but also control signals such as for example acknowledgement signals or signals which notify the wheel units of the time intervals during which they may transmit. This opens up possibilities for coordinating the transmit behavior of wheel units. This makes it possible for example to operate a plurality of wheel units in Time Division Multiple Access (TDMA), in Frequency Division Multiple Access (FDMA), in Frequency Division Duplex (FDD) and/or in Code Division Multiple Access (CDMA) modes. In this way signal collisions can be avoided, or in the event of a signal collision the transmit units can be instructed to send a message once again.

The presence of a receiver unit in the wheel unit also opens up the possibility of a wheel unit being autonomously able to recognize periodically repeating free timeslots and utilizing these to send its own signals.

In accordance with an added feature of the invention, the assignment is a mapping of ranges of value to wheel positions. The fact that the assignment stored in the evaluation unit is an image of ranges of values at wheel positions enables all wheel units on the vehicle to be assigned to their wheel position in a simple manner.

In accordance with an additional feature of the invention, the assignment of the characteristic value representing transmit paths is stored as a relationship. This means that no ranges of values which can differ from vehicle model to vehicle model are stored temporarily in the evaluation unit. For example the evaluation unit can be accommodated very close to the front left wheel position. If the path-dependent characteristic value is the attenuation, for example, the wheel unit for which the smallest attenuation has been determined is accommodated at the left front wheel position. The relationship in this case is as follows: The smallest attenuation determined is to be assigned to the front left wheel position, all other attenuations are not to be assigned to the front left wheel position. With suitable positioning of the receiver unit on the vehicle all wheel units can be assigned to their wheel position in this way.

In accordance with another feature of the invention, the characteristic value is determined based on a plurality of measurements by averaging. The fact that the characteristic value determined is determined on the basis of a plurality of measurements by averaging allows variations in the characteristic value determined, especially variations which are to be attributed to the rotation of the wheels on the vehicle, to be reduced.

In accordance with a further feature of the invention, the wheel unit has an individual code, and the individual code is inserted into messages to be transmitted. This enables the message to be distinguished from messages which originate from other wheel units.

In accordance with again an added feature of the invention, the characteristic value representing the transmit path is the signal attenuation along the path.

In accordance with a concomitant feature of the invention, the wheel unit includes or is a sensor for measuring a parameter, for example the tire pressure.

Other features which are considered as characteristic for the invention are set forth in the appended claims.

Although the invention is illustrated and described herein as embodied in a method and a device for assigning a wheel unit to a wheel position thereof, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
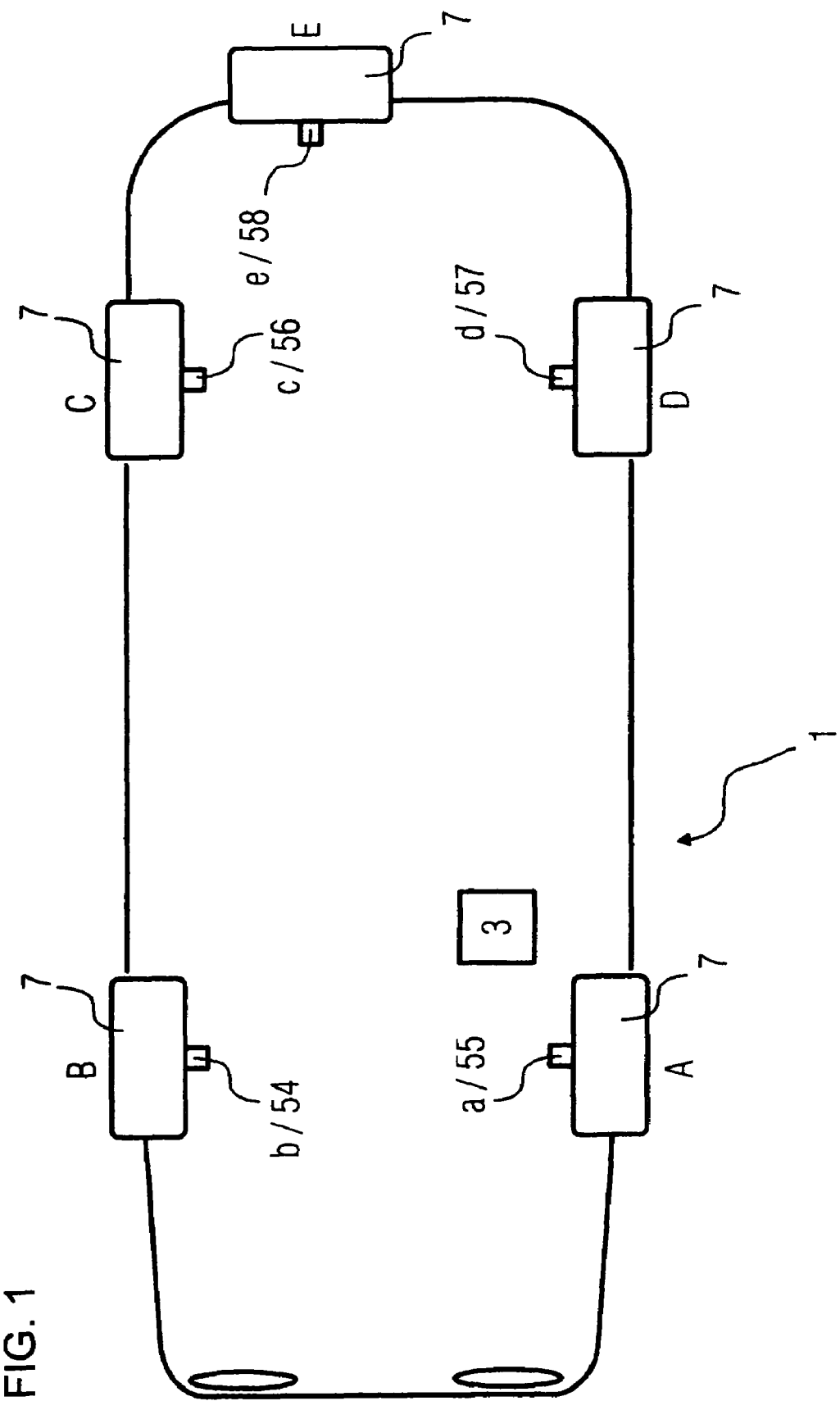
FIG. 1 is a diagram of a vehicle with a tire pressure monitoring system according to claim invention.

Referring now to the figures of the drawing in detail and first, particularly, to FIG. 1 thereof, there is shown, in highly diagrammatic illustration, a motor vehicle 1 with an arrangement of wheel positions A, B, C, D, E as is typical for passenger vehicles. At each wheel position A, B, C, D, E is accommodated a wheel 7 with a wheel unit a, b, c, d, e, in each case, which features a code 54, 55, 56, 57, 58 individually identifying the wheel unit. An evaluation unit 3 is accommodated in the vicinity of a wheel position A, B, C, D, E.

Figure 2:
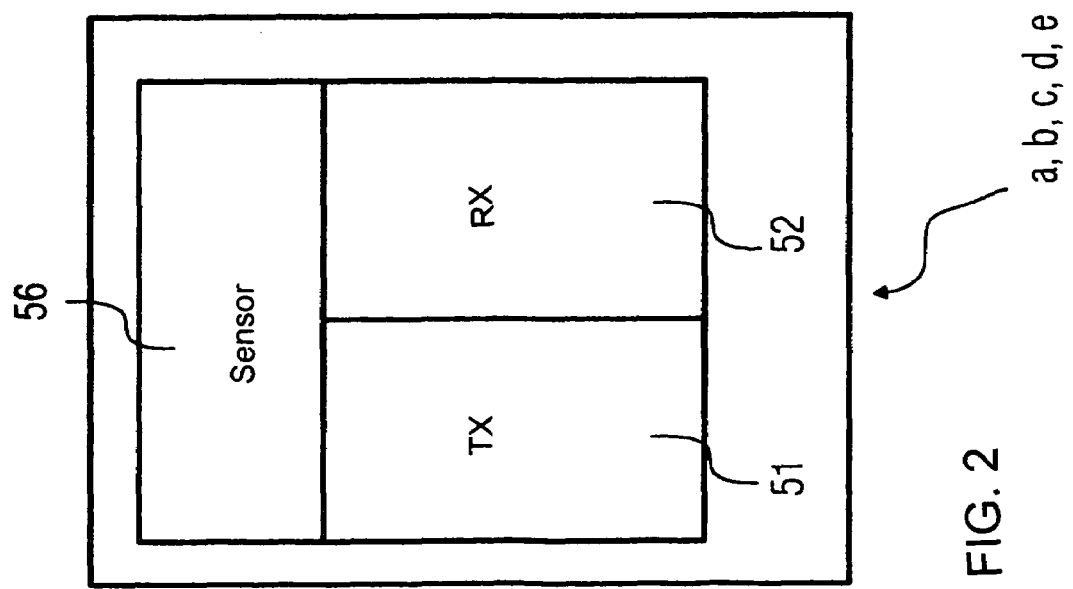
FIG. 2 a diagram of a wheel unit with a transmitter and receiver.

FIG. 2 shows a transmitter unit a, b, c, d, e. The transmitter unit has a transmission unit 51 (TX) and a receiving unit 52 (RX) and a sensor 56.

Figure 3:
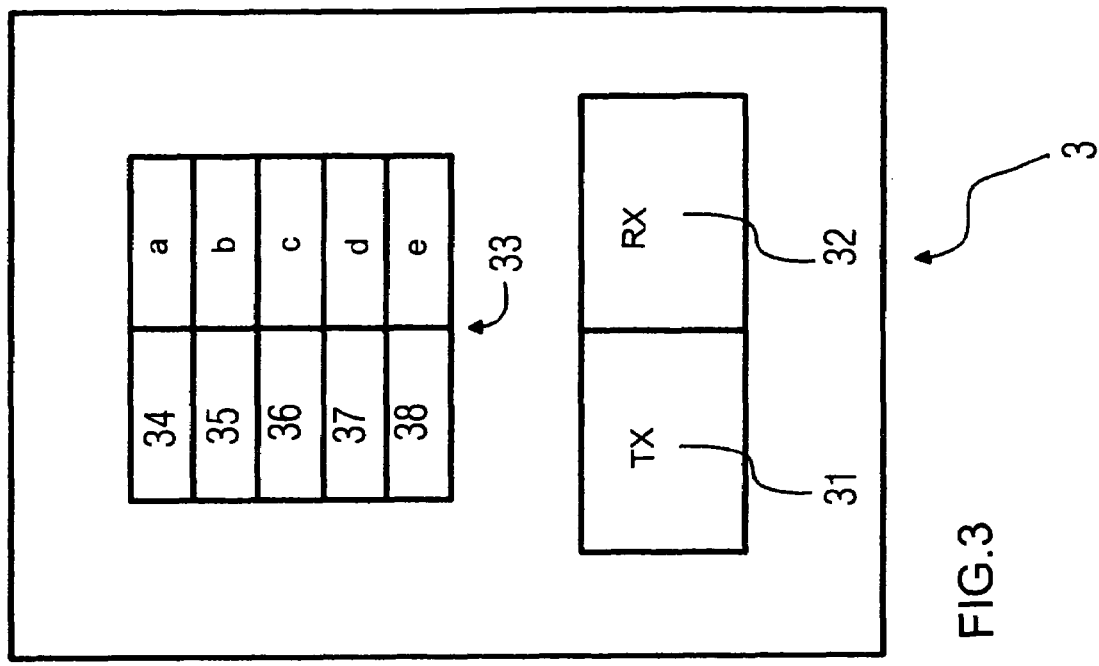
FIG. 3 is a diagram of an evaluation unit with a transmitter, a receiver and an assignment

FIG. 3 shows an evaluation unit 3. Here, a transmission unit 31 and a receiving unit 32 are integrated into the evaluation unit. An assignment 33 is stored in the evaluation unit 3 which maps ranges of values 34, 35, 36, 37, 38 to wheel units a, b, c, d, e.

In a first embodiment of the invention, the wheel units a, b, c, d, e emit signals which contain the value of the measured tire pressure. A suitable circuit is used to also add to the message contained in a signal the value of the intensity of the signal at the location of the wheel unit a, b, c, d, e. The information about signal intensity at the location of the wheel unit a, b, c, d, e can however also be buffered in the wheel unit a, b, c, d, e and forwarded with a later message to the evaluation unit. This is advantageous if a circuit does not measure the intensity but the intensity is measured by way of a receiving unit 52 in the wheel unit a, b, c, d, e.

In a receiving unit 32 of the evaluation unit 3 the signals are received and their intensities at the location of the receiving unit 32 are measured. The number tripple (intensity at wheel unit a, b, c, d, e, intensity at receiving unit 32 of the evaluation unit 3, tire pressure) of the signal is forwarded to the evaluation unit 3. The receiving unit 32 can also be integrated into the evaluation unit 3 for this purpose.

One of the challenges is to distinguish the two measurements of a signal emitted by a wheel unit a, b, c, d, e at the start and at the end of a radio link from the measurements of signals of other wheel units a, b, c, d, e. This criterion requires that signals from different sources are able to be distinguished. This requirement is met for example by each wheel unit a, b, c, d, e having its own code which is packed into the signals. A code of the wheel units a, b, c, d, e is not however a mandatory requirement. The origin of the signals is essentially solely able to be distinguished by the transmitter units 51 of the wheel units a, b, c, d, e emitting a signal at regular intervals, for example every 60 seconds. The signals can then be provided with a time stamp to distinguish between them. With sufficiently large time intervals between the emitted messages, the evaluation unit 3 assigns two intensity measurements, which essentially arrive simultaneously, to the same wheel unit a, b, c, d, e.

The evaluation unit 3 logically combines the two intensity measurements of a signal and determines the attenuation along a transmit path which the signal has encountered on its way from the wheel unit a, b, c, d, e to the receiving unit 32 of the evaluation unit 3. The value determined is compared with stored attenuation ranges which correspond to an assignment 33 to the wheel positions A, B, C, D, E. With this embodiment the wheel units a, b, c, d, e do not have to feature any receivers. The receiving unit 32 of the evaluation unit 3 must however be accommodated in the motor vehicle 1 so that the stored ranges of values assigned to the individual wheel units a, b, c, d, e do not overlap.

In a second exemplary embodiment a first transmission unit 31 (TX) and a first receiving unit (RX) are integrated into the evaluation unit 3 on the motor vehicle 1. It is advantageous, but not necessary, for the first transmission unit, similar to the wheel unit of the first exemplary embodiment, to have an individual code which is sent with signals to be emitted. In this exemplary embodiment the first transmission unit thus has an individual code. A wheel unit a, b, c, d, e also features a code individualizing the wheel unit as well as a second transmission unit 51 and a second receiving unit 52.

To avoid signal collisions all transmission units operate in Time Division Multiple Access (TDMA) mode. The transmitter units are also assigned at regular intervals to time windows during which they can transmit. If a signal collision occurs despite these measures, at the start of the system for example, or if other vehicles are present in the receive area of the receive units 32, 52, the transmitter units are instructed to send the message again.

The first transmitter unit 31 transmits a signal. The first receiving unit 32 measures the intensity of the signal at the location of the evaluation unit 3 and forwards the measured value to the evaluation unit 3.

A receiving unit 52 of a wheel unit a, b, c, d, e receives the signal and measures its intensity at the location of the wheel unit a, b, c, d, e. In its next time window the second transmitter unit transmits a message which sends the measured intensity to the evaluation unit.

In the evaluation unit, from the intensity is measured at the location of the evaluation unit 3 and of the wheel unit a, b, c, d, e of the signal sent out by the first transmitting unit the attenuation along the send path is calculated. This is compared with the ranges of values 34, 35, 36, 37, 38 stored in evaluation unit 3 for the wheel positions A, B, C, D, E to see if there is a match.

In a third exemplary embodiment, in the same way as in the second exemplary embodiment, the attenuation along the transmission path from first transmitter unit 31 to second transmitter unit 52 is measured. The first transmitter unit 31 is however not integrated into the evaluation unit 3 but is accommodated at another position in the motor vehicle 1. The first transmitter unit 31 emits a first signal. At the location of the first transmitter unit 31 the intensity of the signal is measured and emitted with a second signal during the next time window of the first transmitter unit 31. In the wheel unit a, b, c, d, e the intensity of the signal of the first transmitter unit 31 at the location of the wheel unit a, b, c, d, e is measured and logically combined with the intensity contained in the second signal so that the attenuation is produced as a result. The attenuation is then forwarded by the wheel unit a, b, c, d, e to the evaluation unit, and compared there with the associated ranges of values 34, 35, 36, 37, 38 stored in the evaluation unit 3 for the wheel positions A, B, C, D, E to see if there is a match.

I claim:

1. A method for assigning a wheel unit to a wheel position on a motor vehicle, which comprises:
   providing the wheel unit with a transmission unit for emitting a signal;
   providing an evaluation unit on the motor vehicle, and a receiving unit connected to the evaluation unit and disposed to receive the signal emitted by the wheel unit, the evaluation unit having stored therein a characteristic value representing an assignment of a transmission path from a given wheel position to the receiving unit;
   measuring an intensity of the signal emitted by the wheel unit in the receiving unit and communicating the intensity to the evaluation unit;
   determining a characteristic value from a logical combination of the intensity of the signal measured in the receiving unit and the intensity at the location of the wheel unit; and
   applying the assignment to the characteristic value determined in the determining step.

2. The method according to claim 1, wherein the assignment is a mapping of ranges of value to wheel positions.

3. The method according to claim 1, which comprises storing the assignment of the characteristic value representing transmit paths as a relationship.

4. The method according to claim 1, which comprises determining the characteristic value based on a plurality of measurements by averaging.

5. The method according to claim 3, which comprises determining the characteristic value based on a plurality of measurements by averaging.

6. The method according to claim 1, wherein the wheel unit has an individual code, and the method comprises inserting the individual code into messages to be transmitted.

7. The method according to claim 1, wherein the characteristic value representing the transmit path is an attenuation along the path.

8. The method according to claim 4, wherein the characteristic value representing the transmit path is an attenuation along the path.

9. The method according to claim 1, wherein the wheel unit comprises a sensor for measuring a parameter.

10. The method according to claim 8, which comprises measuring a tire pressure with the sensor.

11. The method according to claim 2, wherein the wheel unit comprises a sensor for measuring a parameter.

12. The method according to claim 11, which comprises measuring a tire pressure with the sensor.

13. The method according to claim 4, wherein the wheel unit comprises a sensor for measuring a parameter.

14. The method according to claim 13, which comprises measuring a tire pressure with the sensor.

15. A method for assigning a wheel unit to a wheel position on a motor vehicle, which comprises:
    providing a first transmissing unit and an evaluation unit on the motor vehicle, assigning the evaluation unit a first receiving unit, and providing the wheel unit with a second transmitter unit;
    providing the wheel unit with a second receiving unit for receiving a signal emitted by the first transmission unit, and wherein the evaluation unit has a characteristic value stored therein representing an assignment of the transmission path from the first transmission unit to a wheel position;
    transmitting a given signal with the first transmission unit;
    measuring an intensity of the given signal at a location of the first transmission unit;
    sending, with the first transmission unit, a message containing the intensity of the given signal at the location of the first transmission unit;
    measuring an intensity of the given signal at a location of the second receiving unit;
    determining a characteristic value from a logical combination of the intensity measured at the location of the first transmitter unit and the intensity measured at the location of the second receiving unit;
    sending a message from the second transmission unit to the evaluation unit that can be distinguished from messages sent by other wheel units, the message containing the intensity of the signal measured at the location of the second receiving unit or of the characteristic value; and
    applying the assignment to the characteristic value determined in the determining step.

16. The method according to claim 15, wherein the assignment is a mapping of ranges of value to wheel positions.

17. The method according to claim 15, which comprises storing the assignment of the characteristic value representing transmit paths as a relationship.

18. The method according to claim 15, which comprises determining the characteristic value based on a plurality of measurements by averaging.

19. The method according to claim 17, which comprises determining the characteristic value based on a plurality of measurements by averaging.

20. The method according to claim 15, wherein the wheel unit has an individual code, and the method comprises inserting the individual code into messages to be transmitted.

21. The method according to claim 15, wherein the characteristic value representing the transmit path is an attenuation along the path.

22. The method according to claim 18, wherein the characteristic value representing the transmit path is an attenuation along the path.

23. The method according to claim 15, wherein the wheel unit comprises a sensor for measuring a parameter.

24. The method according to claim 23, which comprises measuring a tire pressure with the sensor.

25. The method according to claim 16, wherein the wheel unit comprises a sensor for measuring a parameter.

26. The method according to claim 25, which comprises measuring a tire pressure with the sensor.

27. The method according to claim 18, wherein the wheel unit comprises a sensor for measuring a parameter.

28. The method according to claim 27, which comprises measuring a tire pressure with the sensor.

29. An assembly for assigning a wheel unit to a wheel position on a motor vehicle, comprising:
   an evaluation unit and a first transmission unit disposed on the motor vehicle, and a first receiving unit connected to said evaluation unit;
   the wheel unit having a second receiving unit disposed to receive a signal emitted by said first transmission unit and a second transmission unit; and
   said evaluation unit having stored therein a characteristic value representing an assignment of a transmission path from said first transmission unit to the wheel position.

30. The assembly according to claim 29, wherein the assignment is a mapping of ranges of values to wheel positions.

31. The assembly according to claim 29, wherein the assignment of the characteristic value representing transmission paths is stored as a relationship.

* * * * *